US012665238B2

(12) United States Patent (10) Patent No.: US 12,665,238 B2
Kastler et al. (45) Date of Patent: Jun. 23, 2026

(54) TEMPERATURE-CONTROL DEVICE FOR INDIVIDUAL BATTERY CELLS COMBINED TO FORM A MODULE

(71) Applicant: John Deere Electric Powertrain LLC, Moline, IL (US)

(72) Inventors: Helmut Kastler, Freistadt (AT); Philipp Kreisel, Freistadt (AT)

( * ) Notice: Subject to any disclaimer, the term of this patent is extended or adjusted under 35 U.S.C. 154(b) by 738 days.

(21) Appl. No.: 18/020,537

(22) PCT Filed: Jul. 21, 2021

(86) PCT No.: PCT/AT2021/060256
§ 371 (c)(1),
(2) Date: Feb. 9, 2023

(87) PCT Pub. No.: WO2022/032315
PCT Pub. Date: Feb. 17, 2022

(65) Prior Publication Data
US 2024/0030515 A1 Jan. 25, 2024

(30) Foreign Application Priority Data

Aug. 10, 2020 (AT) .............................. A 50668/2020

(51) Int. Cl.
*H01M 10/6556* (2014.01)
*H01M 10/617* (2014.01)
*H01M 10/6568* (2014.01)

(52) U.S. Cl.
CPC ..... *H01M 10/6556* (2015.04); *H01M 10/617* (2015.04); *H01M 10/6568* (2015.04)

(58) Field of Classification Search
CPC ........... H01M 10/6556; H01M 10/617; H01M 10/6568; H01M 10/643; H01M 10/6557;
(Continued)

(56) References Cited

U.S. PATENT DOCUMENTS

2002/0177035 A1* 11/2002 Oweis ............... H01M 10/6567
429/120
2012/0003522 A1 1/2012 Fuhr et al.
(Continued)

FOREIGN PATENT DOCUMENTS

AT 520928 B1 9/2019
AT 520409 B1 2/2020
(Continued)

*Primary Examiner* — Muhammad S Siddiquee
(74) *Attorney, Agent, or Firm* — Tiajoloff & Kelly LLP

(57) ABSTRACT

A temperature-control device for individual battery cells (1) combined to form a module has a main body (2) that, in order to circumferentially surround the battery cells (1), has passage openings (4) situated opposite one another in pairs in relation to a respective joining axis (3) and that forms a flow channel (5) for a temperature-control fluid. The flow channel (5) runs transversely with respect to the joining axes (3). In order to make a reduced temperature spread possible within a battery module whilst simultaneously providing good homogeneous temperature control of the individual battery cells of the battery module, the flow channel (5) is divided into at least two chambers (7, 8) by a membrane (6) that runs transversely with respect to the joining axes (3) and that has passage openings (4) for the battery cells (1).

20 Claims, 4 Drawing Sheets

Figure 1:
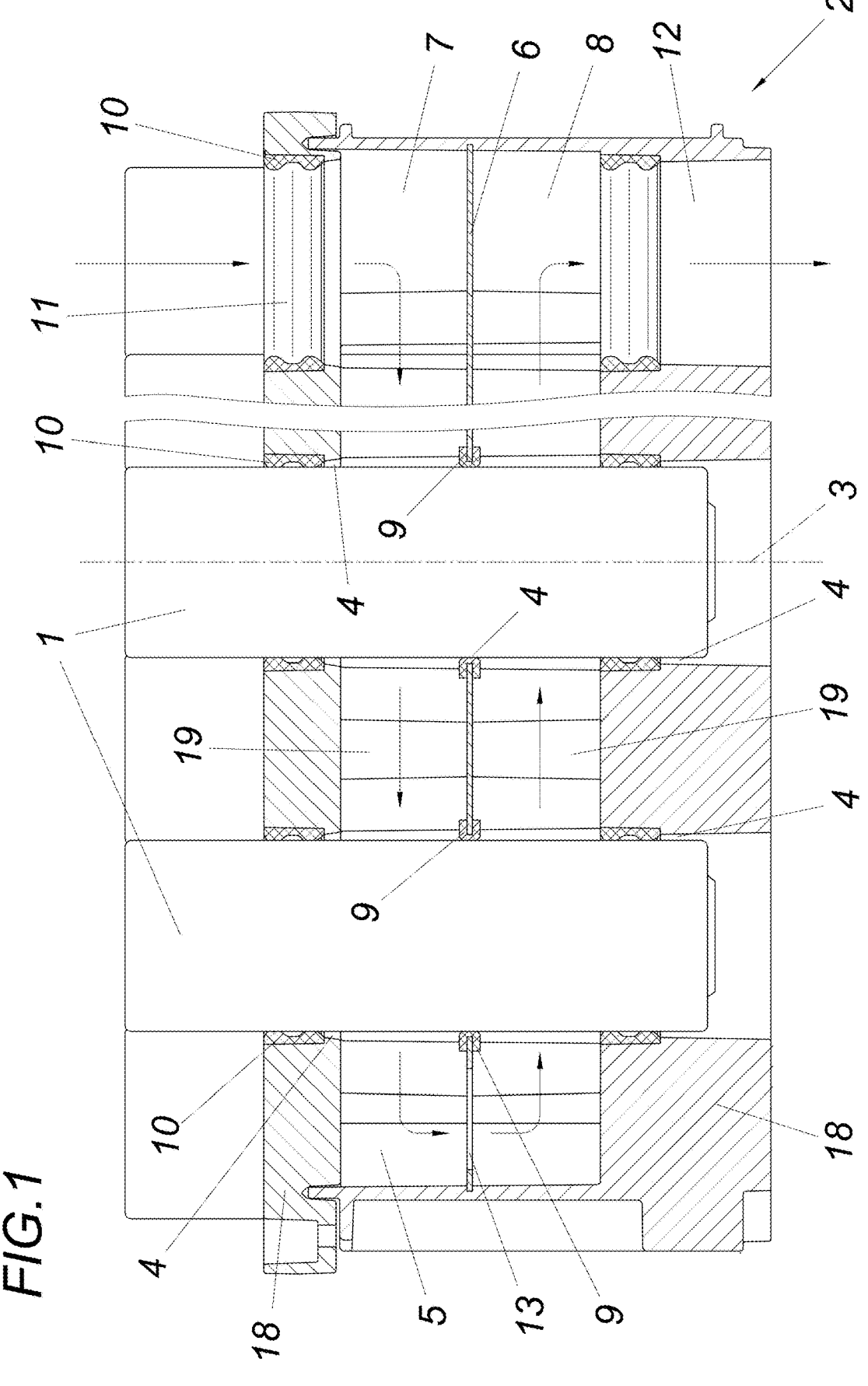

(58) Field of Classification Search
CPC .. H01M 10/6566; H01M 50/213; Y02E 60/10
See application file for complete search history.

(56) References Cited

U.S. PATENT DOCUMENTS

| | | | |
|---|---|---|---|
| 2016/0233565 A1* | 8/2016 | Weileder ............... | H01M 50/24 |
| 2021/0167444 A1* | 6/2021 | Gaigg ................. | H01M 10/613 |
| 2021/0249706 A1 | 8/2021 | Kreisel et al. | |

FOREIGN PATENT DOCUMENTS

| | | | | |
|---|---|---|---|---|
| CN | 205882114 U | * | 1/2017 | |
| DE | 102013225521 A1 | | 6/2015 | |
| EP | 3419079 A1 | | 12/2018 | |
| KR | 100667943 B1 | | 1/2007 | |
| WO | 2019/232557 A1 | | 12/2019 | |
| WO | WO-2024189154 A1 | * | 9/2024 | ........ H01M 10/0481 |

* cited by examiner

TEMPERATURE-CONTROL DEVICE FOR INDIVIDUAL BATTERY CELLS COMBINED TO FORM A MODULE

FIELD OF THE INVENTION

The invention relates to a temperature-control device for individual battery cells combined to form a module, having a main body which, in order to circumferentially surround the battery cells, has passage openings situated opposite one another in pairs in the direction of a joining axis and forms a flow channel for a temperature-control fluid, which flow channel runs transversely with respect to the joining axes.

DESCRIPTION OF THE PRIOR ART

A temperature-control device for individual battery cells combined to form a module is known from AT520920. For this purpose, the temperature-control device has a two-part main body which, for the purpose of circumferentially enclosing the battery cells, forms passage openings opposite each other in pairs with respect to a joining axis. Together with the battery cells, the main body defines a flow channel for a temperature-control fluid which flows directly onto the battery cells transverse to their joining axes. Although the sealing between the battery cells and the passage openings is technically complex at the required operating pressure of the temperature-control fluid, the almost complete flow around the battery cells from the jacket side without intermediate cooling lines ensures uniformly good temperature control of the individual battery cells. The disadvantage, however, is that the temperature-control fluid is gradually heated in the direction of flow, so that the cooling capacity decreases in the direction of flow. This results in a temperature spread between the battery cells arranged on the temperature-control fluid inlet side and the battery cells arranged on the temperature-control fluid outlet side, especially in modules with many battery cells. Such temperature differences lead on the one hand to reduced power efficiency and on the other to accelerated aging of the battery modules.

In order to apply an almost identical cooling capacity to all battery cells within a module, the temperature-control device known from DE102013225521A1 has two cooling lines extending transversely to the longitudinal axis of the battery cells, with both cooling lines being in contact with each battery cell to be cooled for heat transfer. The flow directions of the temperature-control fluid running in the cooling lines can be opposite to each other. Although this results in a smaller temperature spread within the module, the individual battery cells themselves are subjected to an increased thermal load, since heat exchange between the temperature-control fluid and the battery cells can only take place via the contact points of the cooling lines with the battery cells. This results not only in a lower cooling capacity, but also in inhomogeneous cooling of the individual battery cells, which leads to accelerated aging of the battery cell and a lower possible electrical load.

SUMMARY OF THE INVENTION

The invention is thus based on the object of proposing a temperature-control device of the type described at the beginning, which enables a reduced temperature spread within a battery module while at the same time providing good homogeneous temperature control of the individual battery cells of the battery module.

The invention solves the set object by dividing the flow channel into at least two chambers by means of a membrane extending transversely with respect to the joining axes and having passage openings for the battery cells. The invention is based on the knowledge that, particularly in cylindrical battery cells, heat transfer is significantly better in the longitudinal or joining direction than transversely, which is due to the layered structure of the wound cell core. According to the features of the invention, the temperature-control fluid flows around each battery cell along its joining axis in all chambers, wherein the temperature-control fluid in at least a first group of chambers flows in the opposite direction to the temperature-control fluid in a second group of chambers. In the simplest case, two chambers, namely an inlet chamber and a return chamber, can be provided, which are separated from each other by the membrane. However, multiple membranes may also be provided to separate the flow channel into multiple chambers. In this case, the outer chambers, each bounded by only one membrane, can form the inlet chamber and the return chamber. Particularly favorable temperature control conditions result when the flow directions of the temperature-control fluid of two adjacent chambers are opposite to each other. The temperature difference between the respective inflow and return temperature-control fluid is compensated by the good heat transfer within the battery cell in the direction of its joining axis. In addition, the membrane can be kept thin due to the low pressure differences between the individual chambers and the associated low mechanical stress, so that the area of the respective battery cell shell located in the area of the passage openings and not washed around remains small. Thus, on the one hand, the temperature spread within a temperature-control device is minimized and, on the other hand, good homogeneous temperature control of the individual battery cells is achieved. Since the main body must already have a corresponding seal for the temperature-control fluid in the flow channel, the additional membrane does not cause any additional expense with regard to this seal.

Because the pressure difference between the chambers is comparatively small in contrast to the pressure difference between the flow channel and the outside of the main body, there are relatively low requirements for the sealing of the chambers by the membrane. In typical applications of the invention, the pressure difference between the flow channel and the outside of the main body can be more than ten times the pressure difference between the chambers. Thus, the passage openings of the main body may be provided with a main body seal capable of withstanding a higher pressure differential than membrane seals located at the passage openings of the membrane. While the main body seals are usually ring seals with relatively high surface pressure or combinations of several seals in series, the membrane seals can form simple sealing lips, which in a particularly simple embodiment are formed by the membrane itself.

The membrane may be closed except for the passage opening for the battery cells if separate inlets and outlets are provided for the chambers. To further reduce the sealing effort, it is proposed that the membrane has a flow opening connecting the at least two chambers. Depending on the positioning of the inlets and outlets and the flow opening, different flow directions and thus different temperature conditions can thus be created in the individual chambers.

In order to be able to connect several temperature-control devices in a simple manner, it is proposed that the main body has an inlet flow-connected to an inlet chamber and an outlet flow-connected to a return chamber. In the context of the present invention, an inlet chamber is basically understood to be a chamber in which the temperature-control fluid has a smaller temperature difference from a predetermined set temperature compared to the return chamber. Accordingly, the inlet chamber is arranged on the inlet side and the return chamber on the return side. In this context, different embodiments are possible, which are described in more detail below.

In the case of a single temperature-control device or as a termination for several temperature-control devices connected in series, the membrane can have a flow opening connecting the inlet and return chambers, which is spaced from the inlet and outlet of the main body transversely to the joining axes. Consequently, the temperature-control fluid entering via the inlet flows through the inlet chamber in a first flow direction, enters the return chamber through the flow opening in the membrane and flows back there to the outlet against the first flow direction. Inlet and outlet are opposite each other with respect to the membrane for this purpose and can preferably lie on a common axis parallel to the joining axes. The flow opening of the membrane can be provided on the side of the main body opposite the inlet or outlet in the first flow direction.

In a particularly preferred embodiment, the main body can have at least two inlets that are opposite at least two outlets in the direction of the joining axes, i.e. with respect to the membrane. This means that in each case at least two outlets or two inlets are arranged on the same side of the main body with respect to the membrane. In this way, two mutually opposite flow directions are formed in the inlet and return chambers, namely in each case from an inlet to the flow opening, which in this case is preferably arranged centrally in the membrane, and further to the at least two mutually opposite outlets. Thus, both halves of the temperature-control device, each forming from the flow opening to the inlets and outlets, are temperature controlled in counterflow, namely on the inlet side in the inlet chamber from the respective inlet to the flow opening and on the outlet side in the return chamber from the flow opening to the respective outlet.

In order to connect a plurality of temperature-control devices to each other in a particularly advantageous manner, it is proposed that an inlet and an outlet are arranged both in the direction of the joining axes and transversely to the direction of the joining axes, i.e. with respect to the membrane on the same side of the main body. In this way, two adjacent temperature-control devices can be flow-connected to each other via only one connection point, namely in the area of the adjacent inlets and outlets. In a preferred embodiment, the inlet and outlet of a temperature-control device run in the direction of the joining axes and are located on the side of the main body having passage openings for the battery cells. In this case, either the inlet or the outlet must pass through one of the chambers in order to establish a flow connection with the other chamber for a flow in opposite directions to the battery cells in an inlet and return chamber.

In order to achieve an even more compact design for the connection point, the inlet and outlet can each form a connection piece, wherein one connection piece passes through the other connection piece. In order to achieve matching flow velocities, it is proposed that the free cross-section of the two connection pieces matches in terms of amount. If a temperature-control device is to be connected to further temperature-control devices, these can each have two of these connections designed in the sense of a double tube, wherein these connections are arranged both in the direction of the joining axes and transversely to the direction of the joining axes on the respective other side of the main body. In order to prevent a temperature spread within several temperature-control devices connected to each other in this way, the connection piece of the inlet can run through the connection piece of the outlet in the case of one connection and the connection piece of the outlet can run through the connection piece of the inlet in the case of the other connection.

To enable simple assembly of the temperature-control device, it is proposed that the main body comprises two sealing elements opposite each other in the direction of the joining axes and that at least one of the sealing elements has retaining pins for the membrane projecting into the flow channel. The main body is thus constructed in two parts. In this way, the sealing elements can be assembled with the interposition of one or more membranes separated by spacers, whereupon the battery cells can be guided through the respective passage openings of the sealing elements or membrane. In order to support the membrane both during this joining process and during operation of the temperature-control device, at least one sealing element has retaining pins which project into the flow channel and on which the membrane rests. Preferably, retaining pins project from both sealing elements, between which the membrane is guided.

In order to improve heat transfer between the temperature-control fluid and the battery cells by supporting the membrane, the retaining pins can form flow dividers for the temperature-control fluid. As a result of this measure, premature detachment of the temperature-control fluid from the battery cell jacket and thus dead water formation, which negatively affects heat transfer, is prevented.

BRIEF DESCRIPTION OF THE INVENTION

Figure 2:
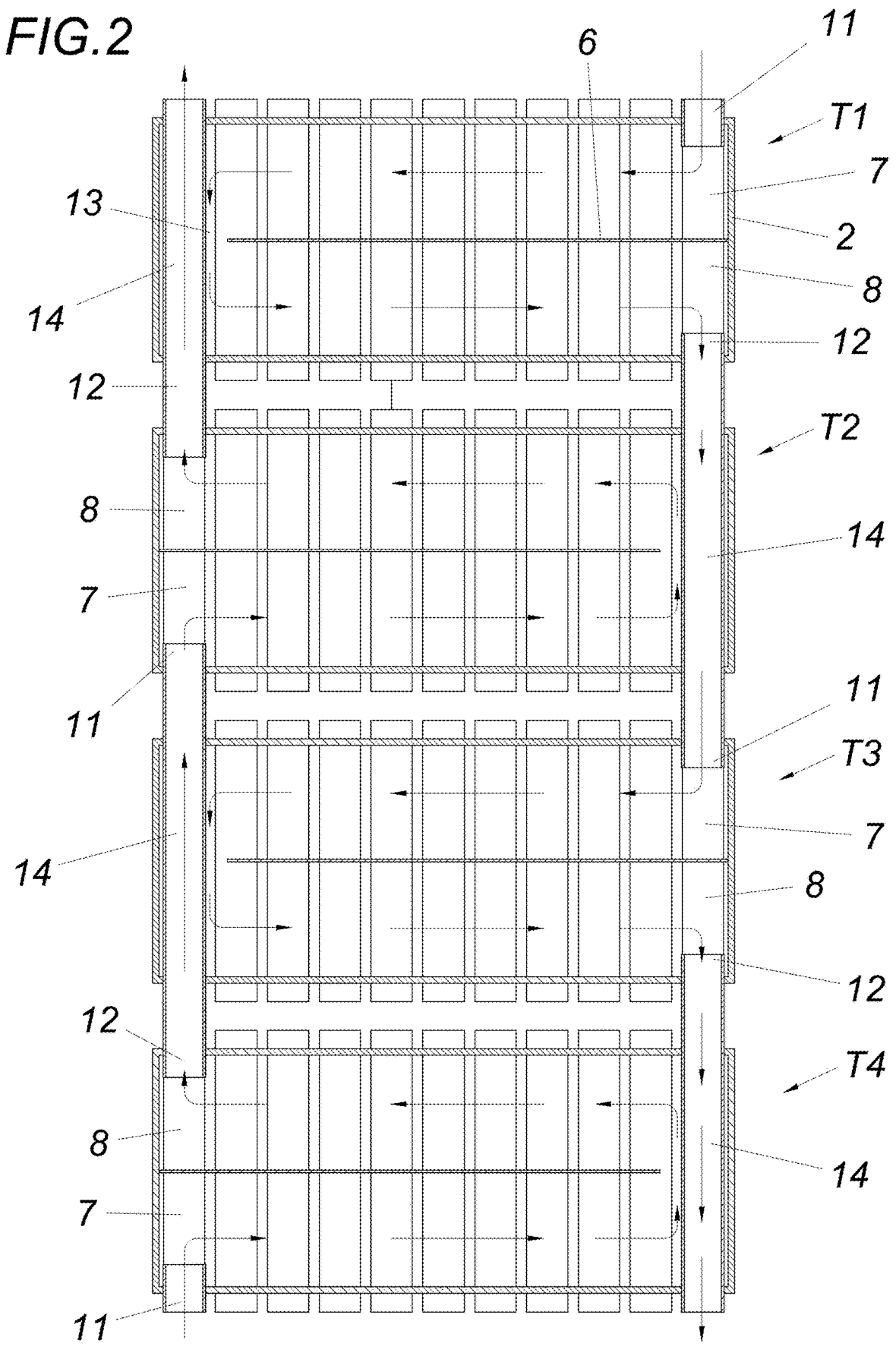
Figure 3:
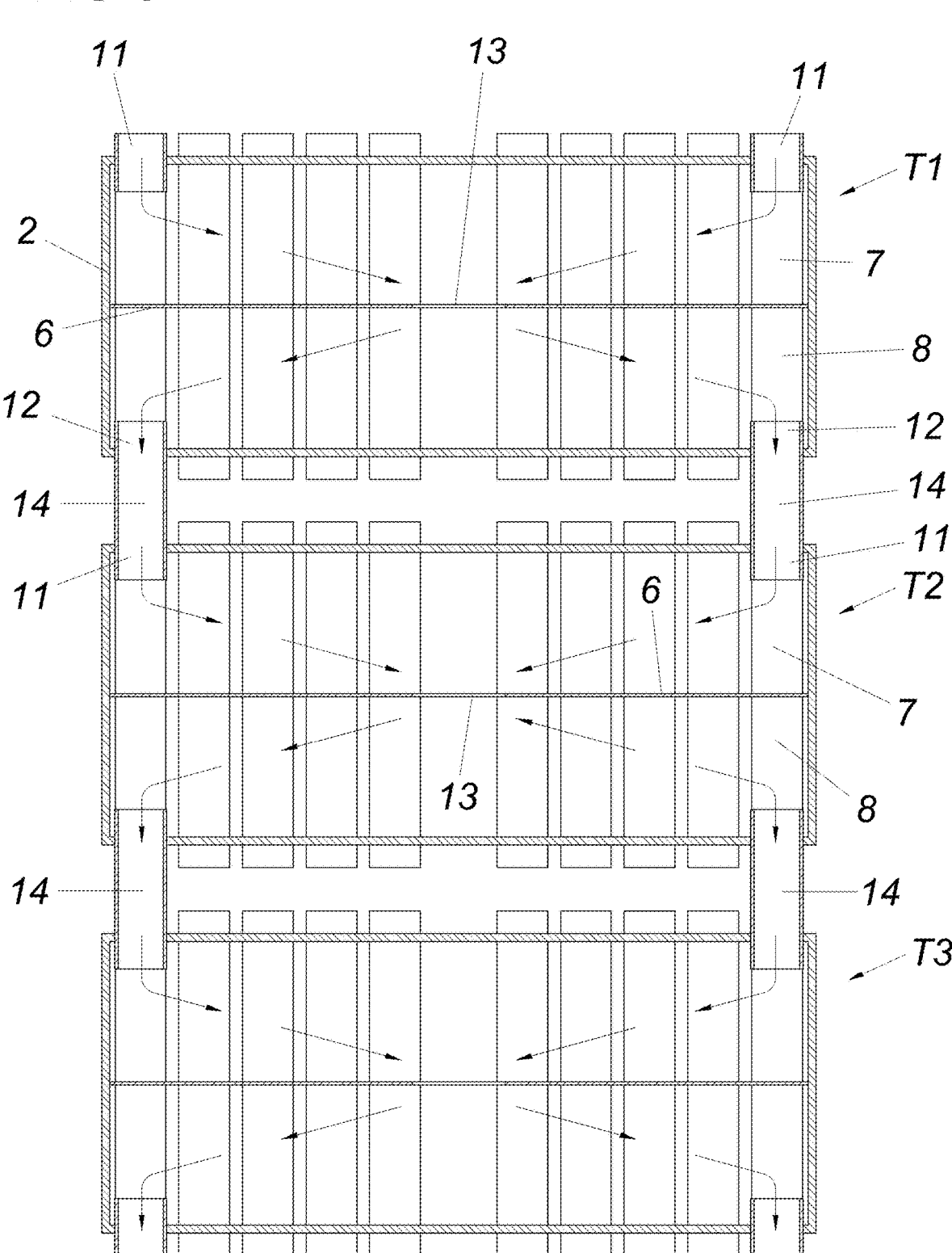
Figure 4:
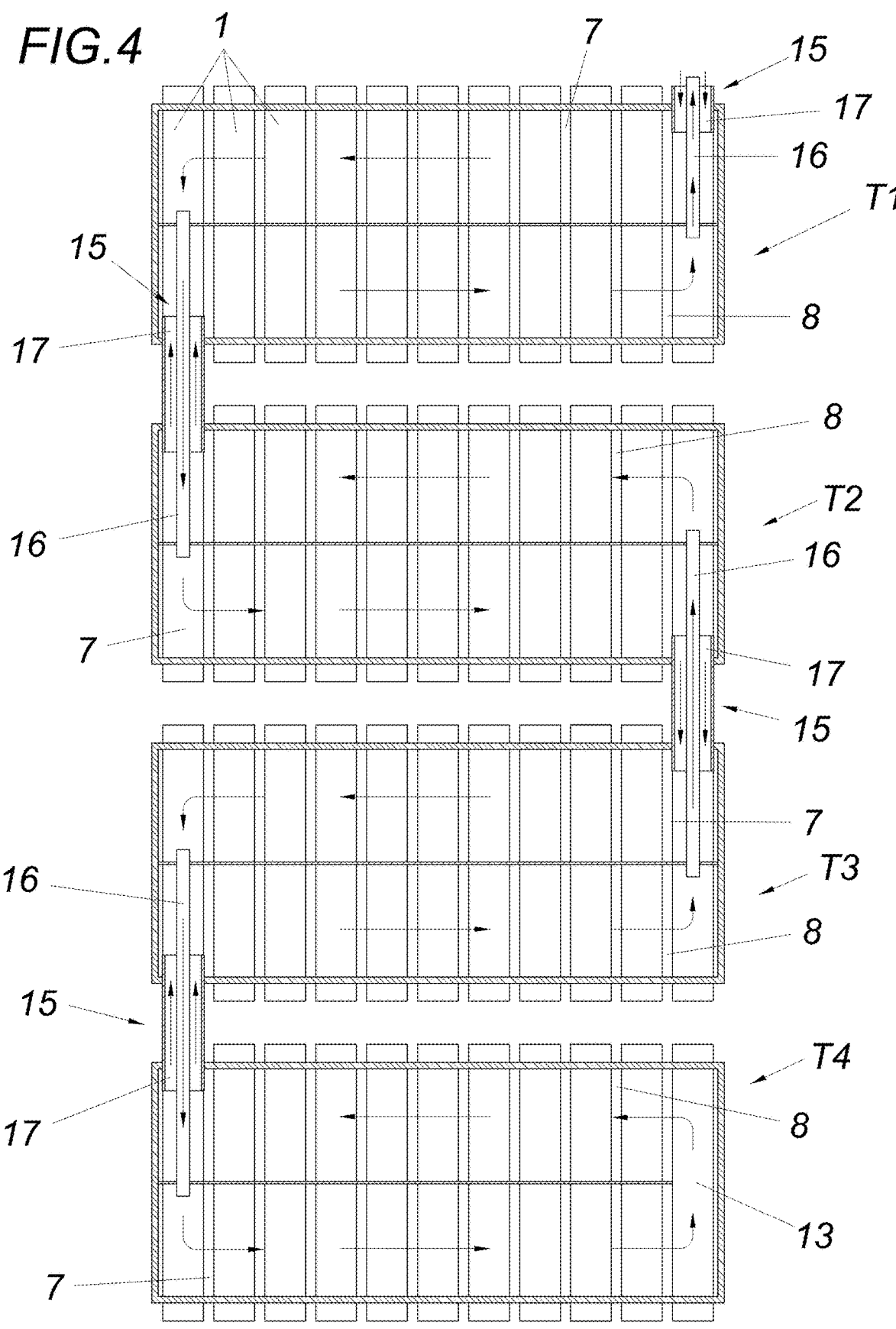

In the drawing, the subject matter of the invention is shown by way of example, wherein:

FIG. 1 shows an outlined section through a temperature-control device according to the invention, FIG. 2 shows a schematic arrangement of several temperature-control devices in a first embodiment, FIG. 3 shows a schematic arrangement of several temperature-control devices in a second embodiment and FIG. 4 shows a schematic arrangement of several temperature-control devices in a third embodiment.

DETAILED DESCRIPTION OF THE
PREFERRED EMBODIMENTS

A temperature-control device according to the invention for individual battery cells 1 combined to form a module has a main body 2, as can be seen in particular in FIG. 1. The main body 2 comprises passage openings 4 opposite each other in pairs with respect to a joining axis 3 for circumferential enclosure of the battery cells 1 and, together with the battery cells 1, delimits a flow channel 5 for a temperature-control fluid, which extends transversely to the joining axes 3. In order to ensure a small temperature spread between the battery cells 1 combined to form a module and at the same time to permit homogeneous temperature control of the individual battery cells 1, the flow channel 5 has a membrane 6 which extends transversely with respect to the joining axes 3 of the battery cells 1 and which separates the flow channel into a plurality of chambers 7, 8, for example into an inlet chamber 7 and a return chamber 8, and in which passage openings 4 are provided for the battery cells 1. The flow directions of the temperature-control fluid flowing in the respective inlet chamber 7 or the return chamber 8 are opposite to each other. As a result of this measure, each battery cell 1 is flowed around by both the temperature-control fluid in the inlet chamber 7 and the temperature-control fluid in the return chamber 8. Since the temperature of the temperature-control fluid increases in the case of cooling in the direction of flow and the flow in the inlet chamber 7 and the return chamber 8 are in opposite directions to each other, each battery cell 1 is subjected to almost the same cooling power, which corresponds to the average value of the cooling power of the inlet chamber 7 and the return chamber 8.

In principle, the pressure difference between the outside of the main body and the flow channel 5 is greater than the pressure difference between the inlet 7 or return chamber 8. As a result, the membrane seals 9 have to withstand a smaller pressure difference than the main body seals 10. The membrane seals 9 can thus comprise a single sealing lip, while double ring seals with a relatively large surface pressure can be provided for the main bodies 2.

Multiple temperature-control devices can be interconnected if the main body 2 has an inlet 11 in flow communication with the inlet chamber 7 and an outlet 12 in flow communication with the return chamber 8.

As can be seen in FIG. 1, the membrane 6 can have a flow opening 13, which flow-connects the inlet chamber 7 to the return chamber 8. Accordingly, the same temperature-control fluid that flows via the inlet 11 through the inlet chamber 7 in a first flow direction enters the return chamber 8 through the flow opening 13 in the membrane 6 and flows back to the outlet 12 in the opposite direction to the first flow direction. By spacing the flow opening 13 from the inlet 11 and outlet 12 transversely to the joining axes 3, the temperature-control fluid is given a desired flow pattern. The flow opening 13 can, for example, be provided on the side of the main body 2 opposite the inlet 11 or outlet 12 as shown in FIG. 1.

FIG. 2 shows the schematic arrangement of a plurality of temperature-control devices according to the invention in a first embodiment. In this context, the outlet 12 of a first temperature-control device T1 is connected to the inlet 11 of the next but one third temperature-control device T3 via a connecting tube 14 extending through the subsequent temperature-control device T2, forming a first temperature-control circuit. A second temperature-control circuit results in an analogous manner if the outlet 12 of the temperature-control device T4 is connected to the inlet 11 of the temperature-control device T2 via a connecting tube 14 passing through the temperature-control device T3.

FIG. 3 shows a second embodiment of the temperature-control device according to the invention, in which the main body 2 can have two inlets 11 and two outlets 12. Inlet 11 and outlet 12 are located opposite each other in the direction of the joining axes 3 and with respect to the membrane 6, respectively. Particularly favorable flow conditions result if the flow opening 13 is arranged centrally in the membrane 6. Two successive temperature-control units of this embodiment are connected to each other by flow-connecting the outlets 12 of a first temperature-control unit T1, which are located on the common side of the membrane 6, to the inlets 11 of the subsequent temperature-control unit T2 via connecting tubes 14. As a result of this measure, two opposing flow directions are formed in the inlet chamber 7 and in the return chamber 8, resulting in two halves of the temperature-control unit which can be temperature-controlled independently of each other using the counterflow principle. This can be advantageous, for example, if battery cells 1 combined to form a module are exposed to an uneven temperature load from the outside of the main body. As can be seen from FIG. 3, the second embodiment of the temperature-control device can also be connected to further temperature-control devices.

FIG. 4 shows a further embodiment of the temperature-control device according to the invention, in which inlet 11 and outlet 12 are arranged on the same side of the main body 2, namely both on the same side in the direction of the joining axis 3 and on the same side transverse to the direction of the joining axes 3. Preferably, inlet and outlet 11, 12 are located on the side of the main body 2 having passage openings 4. In this way, two adjacent temperature-control devices can be flow-connected to each other via only one connection point, comprising an inlet and outlet 11, 12. In this case, the connection 15 for inlet and outlet 11, 12 comprises two connection pieces 16, 17, one of which can pass through the other. As shown in FIG. 4, an inner connection piece 16 connects the inlet chamber 7 of a first temperature-control device T1 to the inlet chamber 7 of a second temperature-control device T2, while an outer connection piece 17 connects the return chamber 8 of the temperature-control device T2 to the return chamber 8 of the temperature-control device T1. The outer connection piece 17 encloses in this case the inner connection piece 16, which conversely passes through the outer connection piece 17. In this embodiment, however, the connection pieces 16, 17 can also be arranged next to each other. In order to connect the inlet branch to the return branch in this embodiment, a final temperature-control device T4 can have only one connection 15 as a connection point, while the membrane 6 of the temperature-control device T4 has a flow opening 13 connecting the inlet chamber 7 to the return chamber 8. In contrast, the inlet and return chambers 7, 8 of the preceding temperature-control device T1-T3 are not flow-connected to each other via a flow opening 13. In this way, a temperature spread can also be reduced between several successively connected temperature-control devices.

As can be seen from FIG. 1, the main body 2 can comprise two sealing elements 18, which are opposite each other in the direction of the joining axes 3. At least one of the sealing elements 18 can have retaining pins 19 projecting into the flow channel 5, which support the membrane 6. Both sealing elements 18 can also have retaining pins 19 so that the membrane 6 can be clamped between them.

The retaining pins 19 can form flow dividers for the temperature-control fluid in order to be able to set optimum flow conditions for the battery cells.

The invention claimed is:

1. A temperature-control device for individual battery cells combined to form a module, said device comprising:
   a main body that has passage openings situated opposite one another in pairs in a direction of a joining axis and forms a flow channel, extending transversely with respect to the joining axes configured to receive a temperature-control fluid;
   wherein a membrane divides the flow channel into at least two chambers, and said membrane extends transversely with respect to the joining axes and has passage openings configured to receive the battery cells.

2. The temperature-control device according to claim 1, wherein the passage openings of the main body are provided with a main body seal that withstands a higher pressure difference than a pressure difference withstood by the membrane seals arranged at the passage openings of the membrane.

3. The temperature-control device according to claim 1, wherein the membrane has a flow opening connecting the at least two chambers.

4. The temperature-control device according to claim 1, wherein the main body has an inlet flow-connected to an inlet chamber and an outlet flow-connected to a return chamber.

5. The temperature-control device according to claim 4, wherein the membrane has a flow opening connecting the inlet chamber and the return chamber, said flow opening being spaced from the inlet and outlet of the main body transversely to the joining axes.

6. The temperature-control device according to claim 5, wherein the main body has at least two inlets that are opposite at least two outlets in the direction of the joining axes.

7. The temperature-control device according to claim 4, wherein the main body has at least two sides, and the inlet and the outlet are arranged both in the direction of the joining axes and transversely to the direction of the joining axes on one of the sides of the main body.

8. The temperature-control device according to claim 7, wherein the inlet and the outlet each form a respective connection piece, wherein one of the connection pieces passes through the other of the connection pieces.

9. The temperature-control device according to claim 1, wherein the main body comprises two sealing elements lying opposite one another in the direction of the joining axes, and wherein at least one of the sealing elements has retaining pins retaining the membrane and projecting into the flow channel.

10. The temperature-control device according to claim 9, wherein the retaining pins form flow dividers dividing flow of the temperature-control fluid.

11. The temperature-control device according to claim 2, wherein the main body has an inlet flow-connected to an inlet chamber and an outlet flow-connected to a return chamber.

12. The temperature-control device according to claim 11, wherein the membrane has a flow opening connecting the inlet chamber and the return chamber, said flow opening being spaced from the inlet and outlet of the main body transversely to the joining axes.

13. The temperature-control device according to claim 12, wherein the main body has at least two inlets that are opposite at least two outlets in the direction of the joining axes.

14. The temperature-control device according to claim 11, wherein the main body has at least two sides, and the inlet and the outlet are arranged both in the direction of the joining axes and transversely to the direction of the joining axes on one of the sides of the main body.

15. The temperature-control device according to claim 14, wherein the inlet and the outlet each form a respective connection piece, wherein one of the connection pieces passes through the other of the connection pieces.

16. The temperature-control device according to claim 3, wherein the main body has an inlet flow-connected to an inlet chamber and an outlet flow-connected to a return chamber.

17. The temperature-control device according to claim 16, wherein the membrane has a flow opening connecting the inlet chamber and the return chamber, said flow opening being spaced from the inlet and outlet of the main body transversely to the joining axes.

18. The temperature-control device according to claim 17, wherein the main body has at least two inlets that are opposite at least two outlets in the direction of the joining axes.

19. The temperature-control device according to claim 16, wherein the main body has at least two sides, and the inlet and the outlet are arranged both in the direction of the joining axes and transversely to the direction of the joining axes on one of the sides of the main body.

20. The temperature-control device according to claim 19, wherein the inlet and the outlet each form a respective connection piece, wherein one of the connection pieces passes through the other of the connection pieces.

* * * * *